United States Patent
Butz et al.

(10) Patent No.: US 10,808,125 B1
(45) Date of Patent: Oct. 20, 2020

(54) BITUMEN COMPOSITION COMPRISING A WAX MIXTURE CONSISTING OF A PETROLEUM SLACK WAX AND A FISCHER-TROPSCH WAX, THE USE OF THE WAX MIXTURE IN BITUMEN COMPOSITIONS, THE USE OF THE BITUMEN COMPOSITION IN ASPHALT COMPOSITIONS, ASPHALT COMPOSITIONS COMPRISING THE BITUMEN COMPOSITION AND THE METHOD OF PRODUCING ASPHALT PAVEMENTS THEREOF

(71) Applicant: Sasol Wax GmbH, Hamburg (DE)

(72) Inventors: Thorsten Butz, Buchholz (DE); Carsten Oelkers, Seevetal (DE); Stefan Strydom, Sasolburg (ZA); William Honiball, Sasolburg (ZA)

(73) Assignee: Sasol Wax GmbH, Hamburg (DE)

( * ) Notice: Subject to any disclaimer, the term of this patent is extended or adjusted under 35 U.S.C. 154(b) by 210 days.

(21) Appl. No.: 16/304,814

(22) PCT Filed: May 26, 2017

(86) PCT No.: PCT/EP2017/062805
§ 371 (c)(1),
(2) Date: Nov. 27, 2018

(87) PCT Pub. No.: WO2017/203052
PCT Pub. Date: Nov. 30, 2017

(30) Foreign Application Priority Data

May 27, 2016 (EP) ..................... 16171822

(51) Int. Cl.
| | |
|---|---|
| *C08L 91/00* | (2006.01) |
| *C08L 91/08* | (2006.01) |
| *C08L 95/00* | (2006.01) |
| *C04B 24/36* | (2006.01) |
| *E01C 11/00* | (2006.01) |
| *E01C 19/10* | (2006.01) |
| *E01C 19/48* | (2006.01) |
| *E01C 9/00* | (2006.01) |
| *E01C 19/23* | (2006.01) |

(52) U.S. Cl.
CPC .............. *C08L 91/08* (2013.01); *C04B 24/36* (2013.01); *C08L 95/00* (2013.01); *E01C 9/001* (2013.01); *E01C 11/00* (2013.01); *E01C 19/1009* (2013.01); *E01C 19/4813* (2013.01); *C08L 2555/72* (2013.01); *E01C 19/23* (2013.01)

(58) Field of Classification Search
CPC ...... C08L 91/08; C08L 95/00; C08L 2555/72; C04B 24/36; E01C 9/001; E01C 11/00; E01C 19/23; E01C 19/1009; E01C 19/4813
USPC ...................................... 404/17, 75
See application file for complete search history.

(56) References Cited

U.S. PATENT DOCUMENTS

| | | | |
|---|---|---|---|
| 3,893,839 A | 7/1975 | Elliot et al. | |
| 4,468,254 A * | 8/1984 | Yokoyama | ............... C08L 91/08 106/271 |
| 8,853,284 B2 * | 10/2014 | Leotsakos | ............ C09D 133/06 516/77 |
| 9,028,602 B2 * | 5/2015 | Chughtai | ................ E01C 7/267 106/274 |
| 10,113,094 B2 * | 10/2018 | Ayambem | ............... C09K 5/063 |
| 2004/0139885 A1 | 7/2004 | Hudson et al. | |
| 2016/0090451 A1 * | 3/2016 | Ayambem | .................. C08J 3/12 106/270 |

OTHER PUBLICATIONS

Y. Edwards, et al., "Rheological Effects of Waxes in Bitumen", Energy & Fuels, vol. 17, No. 3. May 2003, p. 511-520.
Y. Edwards, "Influence of Waxes on Bitumen and Asphalt Concrete Mixture Performance," Road Materials and Pavement Design, vol. 10, No. 2, 2009, p. 313,335.
"Warm Mix Asphalt Technologies Collected Critical Literature Reviews from 2008-2012" Prepared for Transportation Research Board of the National Academies, 2013.

* cited by examiner

*Primary Examiner* — Raymond W Addie
(74) *Attorney, Agent, or Firm* — Bushman Werner, P.C.

(57) ABSTRACT

The present invention relates to a bitumen composition comprising a petroleum slack wax and a Fischer-Tropsch wax, the use of the waxes in bitumen compositions, the use of the bitumen composition in asphalt compositions, asphalt compositions comprising the bitumen composition and a method for producing asphalt pavements and constructions thereof. The bitumen has proved to have better processing characteristics.

15 Claims, No Drawings

BITUMEN COMPOSITION COMPRISING A WAX MIXTURE CONSISTING OF A PETROLEUM SLACK WAX AND A FISCHER-TROPSCH WAX, THE USE OF THE WAX MIXTURE IN BITUMEN COMPOSITIONS, THE USE OF THE BITUMEN COMPOSITION IN ASPHALT COMPOSITIONS, ASPHALT COMPOSITIONS COMPRISING THE BITUMEN COMPOSITION AND THE METHOD OF PRODUCING ASPHALT PAVEMENTS THEREOF

The invention relates to a bitumen composition comprising a wax mixture consisting of a petroleum slack wax and a Fischer-Tropsch wax, the use of the wax mixture in bitumen compositions, the use of the bitumen composition in asphalt compositions, asphalt compositions comprising the bitumen composition and a method for producing asphalt pavements and constructions thereof.

DESCRIPTION OF THE PRIOR ART AND OBJECT OF THE INVENTION

Bitumen is a natural occurring or from the vacuum distillation of crude oil obtainable mixture of organic compounds with elastic-viscose properties. It is sticky, non-volatile, sealing and almost not-soluble in non-polar solvents.

Bitumen is used in a plurality of construction applications, such as coating of buildings, bitumen blanks etc. One of the most important applications is the use as binder for stone aggregates in asphalt for the paving of roads.

Asphalt is produced in large mixing plants with an output of 130 to 350 tons per hour. In this nowadays electronically controlled process the asphalt components are dosed, mixed and homogenized. At first the stone aggregate with a defined particle size and dosage is added to a drum drier. The moisture associated with the stones is evaporated and the required temperature is adjusted. Afterwards the aggregate is transferred into a tower, where the appropriate particle size distribution is produced. Then the hot bitumen and other additives are sprayed on to aggregate and thoroughly mixed with it using either a continuous drum mixer or pug mill batch mixer. At temperatures between 160 and 180° C. the readily mixed asphalt can then be transported into silos or trucks to reach the building site, where it is needed and paved.

Depending on the layer in the pavement and the traffic load various types of asphalt mixes are in use that differ in the gradation of the mineral aggregates sizes and the percentage of bituminous binder. Important examples of asphalt mix types are asphalt concrete for base layers, binder layers and wearing courses, stone mastic asphalt and open graded porous asphalt. A further asphalt mix type is mastic asphalt or Guss asphalt, which is produced at very high temperature above 200° C. and is applied in pourable form. It results in asphalt layers that are almost free of air voids.

Alternatively thin asphalt layers can also be produced by spraying the hot bituminous binder on the surface to be paved, distributing the mineral aggregates over the hot bituminous binder and pressing the aggregates into the binder using a roller. This technique is called spray and chip or chip seal and requires a specific aggregate gradation.

Asphalt mixes and pavements are subjected to strict national and international regulations and standards in order to ensure a high and satisfying performance of the asphalt.

Nowadays asphalt may also be recycled if new pavements are constructed. The recycled pavement is frequently called RAP (reclaimed asphalt pavement). For that the old asphalt will be milled from the pavement, crushed to applicable gradation and mixed with new bituminous binder and stone aggregates to result in a product of at least the quality as new asphalt. A rejuvenator may be added during mix production, if the bituminous binder in the recycled asphalt strongly hardened by ageing during the service life. Mostly RAP is added into an asphalt mixing plant without pre-heating it, applying the "cold addition technique". The heat energy, which is needed for obtaining the final asphalt mix temperature, has to be introduced by the fresh aggregates and bitumen heated to the desired temperature. As there are technical limitations for heating the fresh materials, the percentage of RAP that can be added by the cold addition technique, is limited to 20 to 30 wt.-% of the resulting asphalt mix. The maximum percentage depends on the specific asphalt mix type. Only a few asphalt mixing plants are equipped with a parallel heating drum for pre-heating RAP. This "hot addition technique" allows the addition of higher RAP percentages.

To improve the properties of the asphalt products in general different additives or modifiers may be used, selected from the group of fillers (e.g. hydrated lime, cement, carbon black), extenders (e.g. sulfur, lignin), rubber, elastomeric polymers, plastomeric polymers, resins, fibers (e.g. rock wool, cellulose), anti-oxidants, hydrocarbons, antistripping agents, organosilanes, surfactants and waste materials.

From the prior art it is known that waxes are suitable additives for bitumen to produce high-quality asphalt mixes and asphalt pavements. Especially hydrocarbon waxes, such as paraffin waxes and Fischer-Tropsch waxes have been used.

Waxes in general are mostly defined as chemical compositions, which have a drop melting point above 40° C., are polishable under slight pressure, are knead-able or hard to brittle and transparent to opaque at 20° C., melt above 40° C. without decomposition, and typically melt between 50 and 90° C. with exceptional cases up to 200° C., form pastes or gels and are poor conductors of heat and electricity.

Waxes can be classified according to various criteria such as e.g. their origin. Here, waxes can be divided into two main groups: natural and synthetic waxes. Natural waxes can further be divided into fossil waxes (e.g. petroleum waxes) and non-fossil waxes (e.g. animal and vegetable waxes). Petroleum waxes are divided into macrocrystalline waxes (paraffin waxes) and microcrystalline waxes (micro-waxes). Synthetic waxes can be divided into partially synthetic waxes (e.g. amide waxes) and fully synthetic waxes (e.g. polyolefin- and Fischer-Tropsch waxes).

Paraffin waxes originate from petroleum vacuum distillation cuts. They are clear, odor free and can be refined for food contact. They contain a range of (primarily) n-alkanes and iso-alkanes as well as some cyclo-alkanes. Raw or crude paraffin waxes (slack waxes) have a great number of short-chained and highly branched alkanes ("oils"), which can be removed when deoiled. Different distributions and qualities of paraffin waxes can be obtained therefrom. Further refining may include distillation, bleaching and hydrotreating.

Microwaxes originate from deasphalting, dearomatization and deoiling of petroleum vacuum distillation residues. They are rich in branched and cyclic alkanes and contain generally less than 50% n-alkanes.

Synthetic Fischer-Tropsch waxes or hydrocarbons originate from the catalyzed Fischer-Tropsch synthesis of syngas (CO and H$_2$) to alkanes. There are some major differences between petroleum based paraffin waxes and Fischer-Tropsch waxes which result in deviating properties like e.g. crystallization and rheological behaviour. Another source for the waxes/hydrocarbons are products obtained from the oligomerization/polymerization of olefinic monomers, possibly followed by hydrotreating.

GB 2234512 A discloses a road surfacing composition comprising aggregate and a binder, which comprises bitumen and a viscosity modifier comprising a wax. The viscosity is reduced by at least 25% compared with the original binder. Suitable modifiers include microcrystalline wax, montan wax or coal tar wax but not paraffin wax or oil slack wax. The modified binder is mainly intended for surface dressing (spray and chip) or for hot mix asphalt. Asphalt recycling is not mentioned. Up to and including this publication the presence of paraffin waxes for road surface compositions was held undesirable because it adversely effects the adsorption of asphaltenes onto marble and therefore increases the viscosity of the bitumen composition. This is why usually petroleum vacuum residues that are rich in paraffin waxes by nature are not used as asphalt binder. GB 2234512 A found that harder waxes with a lower penetration (e.g. microcrystalline waxes) are suitable as viscosity reducing agents in bitumen. Instead of completely mixing with the maltenes phase at all states of the asphalt as paraffin waxes do, waxes according to this patent are less compatible with the maltenes and form a dispersed phase at lower temperatures decreasing the viscosity of it significantly.

EP 1017760 B1 discloses the use of synthetic Fischer-Tropsch waxes in asphalt for road pavements to increase the stability thereof. Fischer-Tropsch waxes have a high content of linear hydrocarbons (>90 wt.-%) and can have a high congealing point (up to 105° C.). It was found that 0.5 wt.-% or more Fischer-Tropsch paraffin wax in the bitumen of the asphalt allow a higher compaction of the asphalt and at the same time decrease the viscosity of the bitumen in the liquid state during asphalt mixing.

It was found that Fischer-Tropsch waxes allow a lower temperature of mixing (WMX-warm mix asphalt) but nowadays part of the asphalt industry discusses an increase in the stiffness and low temperature brittleness of the bitumen due to the addition of Fischer-Tropsch waxes.

Based on the improvements discovered further combinations with other additives and uses of Fischer-Tropsch waxes in bitumen have been suggested in the following years.

WO 02/16499 A1 discloses the use of a wax, preferably a synthetic Fischer-Tropsch wax, as hydrocarbon resistant, preferably fuel resistant additive for bitumen. The wax is supposed to render the bitumen more resistant against fuel by being fuel-resistant itself and increasing the compaction rate of the asphalt produced therefrom, thereby decreasing the number of voids in the asphalt accessible to the fuel.

WO 2008/101809 A1 discloses an age-resistant bituminous composition containing at least one paraffin in a concentration of between 0.5 and 5.0 wt.-%. The age resistance is reflected by a lower variation of the ring and ball softening temperature of the bituminous composition after the Rolling Thin Film Oven Test (RTOFT). The paraffins are preferably synthetic paraffins obtained by the Fischer-Tropsch synthesis.

U.S. Pat. No. 8,772,381 B2 discloses the use of waxes in a cross-linked bitumen/polymer composition for improving resistance to chemical attack.

U.S. Pat. No. 8,734,581 B2 discloses bituminous paving mixtures containing lubricating agents or additives which allow paving and compacting of it at temperatures 10 to 55° C. lower than the mixing temperature due to improved compacting properties.

WO 2009/062925 discloses asphalt modifiers for "warm mix" application including adhesion promoter.

US 2010/0227954 A1 discloses asphalt compositions and products comprising petroleum asphalt, polyolefin and a wax.

WO 2014/043021 A1 discloses a non-blown roofing grade bitumen composition comprising a bitumen feedstock, a polyolefin and optionally one or more additives. The composition is used to obtain the desired properties of oxidized bitumen without the need for a blowing process.

EP 2058056 B1 discloses the use of synthetic paraffin wax as hardening agent in the recycling of used/reclaimed asphalt together with softening agents such as oils to reduce the ageing of the bitumen of the reclaimed asphalt.

DE 202005003108 U1 discloses bitumen compositions comprising bitumen, at least one animal and/or vegetable oil and/or fat and at least one wax. One example is the use of a combination of a Fischer-Tropsch wax and rapeseed oil to obtain a bitumen with improved fatigue strength.

US 2014/0076777 A1 discloses a method for upgrading an asphalt (i.e. bitumen) by using waxy bitumen and/or adding at least 3% refinery wax and adding a pour point depressant. The wax shall reduce the viscosity of the bitumen and the pour point depressant shall improve the low temperature performance of the bitumen. Asphalt recycling is not mentioned.

Over time the professional circles realized that each individual wax has certain properties in bitumen, but a combination of different waxes or waxes and other additives may show properties distinct from the properties of the individual components. For example Fischer-Tropsch waxes alone are able to improve the process properties of bitumen and asphalt mixes and the stability of the asphalt obtained therefrom afterwards. On the other hand oils are able to allow recycling of asphalt by acting as rejuvenator. But no wax additive or combination is available from the prior art which improves the processing parameters of bitumen during the asphalt production without negatively altering at the same time the physical properties of the bitumen in the final product, in particular imparting almost no increase of the stiffness and low temperature brittleness of the bitumen and the asphalt.

It is thus an aim of the present invention to find a wax mixture which shows superior properties in bitumen and asphalt mix processing overcoming the disadvantages of the prior art, but have no decisive influence on the physical properties of bitumen.

SUMMARY OF THE INVENTION

It was surprisingly found that a bitumen composition comprising at least one wax mixture consisting of
  20 to 80 wt.-% of a petroleum slack wax (PSW), and
  20 to 80 wt.-% of a Fischer-Tropsch wax (FTW),
each relative to the total mass of the at least one wax mixture (=100 wt.-%) shows superior properties in bitumen processing.

A further embodiment of the invention is the use of the at least one wax mixture in bitumen compositions, preferably to improve the processability and/or elastic recovery thereof.

Yet another embodiment of the invention is the use of the bitumen composition for the production of asphalt compositions, in particular to obtain improved compaction resistance, ageing resistance and/or low temperature performance of the asphalt composition. This allows the application in cold climates (below 10° C. or even 0° C.), for long lasting and durable asphalts as well as for heavy duty and/or heavy traffic asphalt roads.

In another embodiment an asphalt composition comprising the bitumen composition, stone aggregate and fillers is claimed.

Furthermore the invention includes a method for the production of asphalt pavements by making use of the bitumen composition according to the invention.

While known improvements of Fischer-Tropsch waxes such as lower viscosity are present, possible disadvantages such as low temperature brittleness and increased stiffness of the bitumen and the asphalt produced therefrom can be minimized. That means the physical properties of the original bitumen are maintained, while improvements in the processing of the bitumen are achieved.

Moreover, the bitumen composition according to the invention allows a further reduction of the asphalt compaction temperature compared to the sole use of Fischer-Tropsch waxes as the onset of the crystallization of the wax mixture in the bitumen composition and in the asphalt mix made therewith was found to be 30° C. lower.

Surprisingly it was found that the bitumen composition according to the invention allows the processing of increased amounts of recycled asphalts in asphalt compositions using the cold addition technique compared to the state of the art.

Furthermore the better processability of the bitumen composition according to the invention allows the applying and/or compaction of asphalt compositions at temperatures below 150° C.

DETAILED DESCRIPTION OF THE INVENTION

In a preferred embodiment the bitumen composition comprises 0.5 to 2.5 wt.-%, more preferably 1.0 to 2.0 wt.-% of the at least one wax mixture.

The wax mixture preferably consists of 30 to 70 wt.-% of the petroleum slack wax; and 30 to 70 wt.-% of the Fischer-Tropsch wax.

Furthermore the wax mixture more preferably consists of 50 wt.-%, most preferably 40 wt.-% of the petroleum slack wax (PSW); and more preferably 50 wt.-%, most preferably 60 wt.-% of the Fischer-Tropsch wax (FTW).

Petroleum slack waxes as used in the composition according to the invention are defined as crude or raw paraffin waxes originating from petroleum vacuum distillation cuts, which according to a further embodiment are bleached and/or hydrotreated (which according to the understanding of this invention are also defined as slack waxes). They may be further characterized in terms of viscosity classes according to ASTM D 2161 ranging from 80 to 600 SUS (SUS="Saybolt Universal Seconds"), preferably from 300 to 600 SUS.

The petroleum slack wax preferably has one or more of the following features:
  a congealing point according to ASTM D 938 below 65° C.;
  a MEK-oil content according to ASTM D 7211-06 above 15 wt.-%;
  a kinematic viscosity at 100° C. according to ASTM D 7042-11 between 5 and 10 mm$^2$/s, preferably 6 to 8 mm$^2$/s;
  a needle penetration at 25° C. according to ASTM D 1321 above 50 1/10 mm; and
  a n-alkane content below 60 wt.-%.

Fischer-Tropsch waxes as used in the composition according to the invention are defined as waxes originating from the Cobalt- or Iron-catalyzed Fischer-Tropsch synthesis of syngas (CO and H$_2$) to alkanes. The crude product of this synthesis is separated into liquid and different solid fractions by distillation. The waxes contain predominantly n-alkanes, a low number of iso-alkanes and basically no cyclo-alkanes or impurities like e.g. sulfur or nitrogen. In return the number of olefins is higher compared to petroleum based waxes. The Fischer-Tropsch waxes have a congealing point of 30° C. to 105° C. and a carbon chain length of 15 to 65 carbon atoms.

The Fischer-Tropsch wax preferably has one or more of the following features:
  a congealing point according to ASTM D 938 above 70° C., preferably above 75° C., more preferably between greater 75° C. and 85° C. and most preferably between greater 75° C. and 82° C.;
  a MEK-oil content according to ASTM D 7211-06 below 5 wt.-%, preferably below 2 wt.-%;
  a kinematic viscosity at 100° C. according to ASTM D 7042-11 between 5 and 10 mm$^2$/s, preferably 7 to 9 mm$^2$/s;
  a needle penetration at 25° C. according to ASTM D 1321 below 10 1/10 mm; and
  a n-alkane content above 80 wt.-%.

The wax mixture preferably has one or more of the following features:
  a congealing point according to ASTM D 938 between 70 and 85° C., preferably between 72° C. and 83° C. and more preferably between 75° C. and 82° C.;
  a MEK-oil content according to ASTM D 7211-06 below 10 wt.-%;
  a needle penetration at 25° C. according to ASTM D 1321 between 15 and 30 1/10 mm; and
  a n-alkane content above 60 wt.-%.

The above n-alkane content is determined by gas chromatography. The standard method 001/03 of the European Wax Federation may be used for that.

The Fischer-Tropsch wax or the petroleum slack wax are preferably hydrotreated, more preferably both are hydrotreated. Hydrotreatment of the wax components does improve the ageing resistance of the bitumen composition comprising them. Without being bound to this theory this may come from the lower amount of unsaturated hydrocarbons in the wax components after hydrotreatment.

The hydrotreating of the Fischer-Tropsch wax may be conducted catalytically using any suitable technique known to persons skilled in the art of wax hydrotreating. Typically, the Fischer-Tropsch wax is hydrotreated using hydrogen at an absolute pressure between about 30 and about 70 bar, e.g. about 50 bar and an elevated temperature between about 150 and about 250° C., e.g. about 220° C. in the presence of a Nickel-catalyst, such as NiSat 310 available from Sued-Chemie SA (Pty) Ltd of 1 Horn Street, Chloorkop, 1624, South Africa. The hydrotreating of the Fischer-Tropsch wax is to be understood as a process in which components such as alcohols or other compounds containing oxygen and unsaturated hydrocarbons such as olefins are converted to alkanes by a catalytic reaction with hydrogen. It does not include cracking reactions such as hydroisomerization or hydrocracking.

Petroleum slack waxes contain aromatic, sulfur and nitrogen compounds. The slack waxes can be freed from above other components by hydrotreating under enhanced conditions such as a hydrogen pressure of 80 to 150 bar, a temperature of 250 to 350° C. and preferably at space velocities of 0.3 to 2 h$^{-1}$. Preferred catalysts which are suitable for hydrotreating petroleum slack waxes are sulfurized Ni, Mo, W catalysts.

The bitumen composition may also comprise one or more polymers selected from the group of elastomers, e.g. SBS and similar block-co-polymers and plastomers, e.g. EVA or polyolefins, according to one embodiment up to 7 wt. %.

Further additives may be selected from the group of rubber (e.g. up to 25 wt. %), resins (e.g. up to 10 wt. %), anti-stripping agents (e.g. up to 3 wt. %), fibers (e.g. up to 5 wt. %), organosilanes (e.g. up to 2 wt. %), surfactants and/or adhesion promoters (e.g. up to 2 wt. %) such as amines, amides or organic esters of phosphoric acid. It is also possible to add further hydrocarbons (different from above claimed waxes).

Such an asphalt composition may be used for road pavements, airport pavements, fuel station pavements, driveway pavements, parking lot pavements, bicycle and walking path pavements, pavements of logistic areas or agricultural pavements.

Furthermore, the asphalt composition preferably contains greater 25 wt.-%, preferably greater 30 wt.-%, more preferably greater 40 wt.-% and most preferably greater 60 wt.-% reclaimed asphalt.

In another embodiment of the invention the method for the production of asphalt pavements (process A) comprising:
mixing the bitumen composition as described above with mineral aggregate and fillers at temperatures between 150 to 190° C., in case of mastic asphalt up to 250° C., to obtain an asphalt composition;
filling the asphalt composition in a truck or storage silo;
transporting it to the building site;
applying the asphalt composition to the surface with a paver to obtain an asphalt surface; and
compacting the asphalt surface with a roller
is claimed.

The method may comprise adding greater 25 wt.-%, preferably greater 30 wt.-%, more preferably greater 40 wt.-% and most preferably greater 60 wt.-% recycled asphalt without heating it.

In another embodiment of the invention the method for the production of asphalt pavements (process B) comprising:
transporting the bitumen composition as described above to the building site;
spraying the bitumen composition on the surface;
distributing mineral aggregates over the hot layer of the bitumen composition; and
pressing the mineral aggregates into the layer of the bitumen composition using a roller
is claimed.

EXAMPLES

Example 1

Bitumen samples with grade 70/100 (unmodified) according to DIN EN 12591 were mixed with 1.5 wt.-% of wax mixture A (Sasobit Redux, see table 1) consisting of 40 wt.-% Sasolwax C80M and 60 wt.-% Prowax 561 or 1.5 wt.-% of a Fischer-Tropsch wax (Sasobit) relative to bitumen.

TABLE 1

Properties of wax mixture A, petroleum slack wax and Fischer-Tropsch wax used in the wax mixture A and Sasobit.

| | Congealing point [° C.] ASTM D 938 | Penetration @ 25° C. [1/10 mm] ASTM D 1321 | Viscosity @ 100° C. [mm$^2$/s] ASTM D 7042-11 | n-alkane content * | Oil-content ASTM D 7211-06 |
|---|---|---|---|---|---|
| Wax mixture A (60% PSW1/40% FTW1) = Sasobit Redux | 78.0 | 27 | 8.2 | 62.5 | 7.8 |
| PSW1 (Prowax 561 from ExxonMobil) | 63.5 | 76 | 8.5 | 32.6 | 17.4 |
| FTW1 (Sasolwax C80M) | 77.0 | 9 | 8.0 | 86.2 | 1.3 |
| Sasobit | 101.0 | 1 | 12.0 @135° C. | 89.9 | <1.0 |

*By gas chromatography according to the standard method 001/03 of the European Wax Federation The congealing point of the wax mixture A is dominated by the higher-melting Fischer-Tropsch wax component Sasolwax C80M so that it has the same congealing point as the Fischer-Tropsch wax within the accuracy of the applicable method (ASTM D 938).

The properties of the bitumen samples were determined by measuring needle penetration according to DIN EN 1426, the softening point (ring & ball) according to DIN EN 1427 and the complex shear modulus G* as well as the phase angle δ each according to DIN EN 14770, the latter by applying a Dynamic Shear Rheometer. High G* and low δ values mean high stiffness of the bituminous binder (table 2).

TABLE 2

| | Bitumen properties. | | |
|---|---|---|---|
| Parameter [unit] | 0% Wax added (100% bitumen) | 1.5% Wax mixture A (98.5% bitumen) | 1.5% Sasobit (98.5% bitumen) |
| Penetration at 25° C. [0.1 mm] | 72.0 | 59.0 | 48.0 |
| Softening point Ring & Ball [° C.] | 48.8 | 50.4 | 57.4 |
| G* at 40° C. [Pa] | 26840 | 49500 | 69170 |
| G* at 50° C. [Pa] | 6169 | 7767 | 15240 |

TABLE 2-continued

Bitumen properties.

| Parameter [unit] | 0% Wax added (100% bitumen) | 1.5% Wax mixture A (98.5% bitumen) | 1.5% Sasobit (98.5% bitumen) |
|---|---|---|---|
| G* at 60° C. [Pa] | 1671 | 1517 | 3684 |
| Phase angle δ at 40° C. [°] | 78.62 | 74.35 | 70.94 |
| Phase angle δ at 50° C. [°] | 83.35 | 81.20 | 75.51 |
| Phase angle δ at 60° C. [°] | 86.47 | 86.30 | 78.27 |

It can be seen that the wax mixture A has much lower impact on the needle penetration, the softening point, the complex modulus and the phase angle of the bitumen than the Fischer-Tropsch wax Sasobit. These results display the reduced impact on the stiffness of bitumen, when a mixture of petroleum slack wax and Fischer-Tropsch wax is used.

To determine the influence of the additive on the processing of the bitumen comprising the wax mixture according to the invention dynamic viscosities of the bitumen compositions were measured using a parallel plate viscometer with plate diameter 25 mm and 1 mm plate distance at different processing temperatures (see table 3).

TABLE 3

Viscosities of bitumen compositions at different processing temperatures.

| | Viscosity at 120° C., at shear rate 50 Pa [mPa s] | Viscosity at 135° C., at shear rate 30 Pa [mPa s] | Viscosity at 160° C., at shear rate 10 Pa [mPa s] |
|---|---|---|---|
| 70/100 bitumen | 1260 | 550 | 190 |
| 70/100 + 1.5% Sasobit | 980 | 450 | 160 |
| 70/100 + 1.5% wax mixture A | 960 | 455 | 165 |

From the results it can be seen that the bitumen composition according to the invention can be processed with reasonable viscosities at much lower temperatures than the standard, unmodified bitumen. The wax mixture A has nearly the same viscosity reducing impact on bitumen as the state of the art Sasobit though it has much lower impact on the stiffness of soft bitumen grades (see table 2).

Example 2

A bitumen with grade 50/70 (unmodified) according to DIN EN 12591 was mixed with 1.5 wt.-% of wax mixture A (see table 1). After laboratory ageing simulation applying RTFOT (Rotating Thin Film Oven Test, ASTM D2872) and PAV (Pressure Ageing Vessel, DIN EN 14769) the low temperature behavior of the bitumen was characterized by determining the m- an S-value limits applying the Bending Beam Rheometer (BBR) according to ASTM D6648 and comparing it to a bitumen of the same grade without wax (see table 4). RTFOT is performed in the laboratory for simulating the bitumen ageing during asphalt mix production and PAV ageing is performed for simulating the bitumen ageing during the service life of asphalt pavements. The m- and S-value limits are parameters for the stiffness that must not be exceeded. According to ASTM D6373/ASTM D7673 the BBR test was run at different temperatures in order to determine the temperature at which the stiffness limit is reached.

TABLE 4

Low temperature stiffness properties of bitumen grade 50/70 after RTFOT and PAV ageing.

| Parameter [unit] | 50/70 bitumen | 50/70 + 1.5% wax mixture A |
|---|---|---|
| BBR m-value limit temperature [° C.] | −13.8 | −13.9 |
| BBR S-value limit temperature [° C.] | −17.1 | −17.6 |

It was found that the wax mixture A according to this invention does not change the low temperature stiffness of the bitumen, considering the precision of the test method. Lower stiffness limit temperatures after ageing are desired for good performance and durability of asphalt pavements at cold climates.

Example 3

The same bitumen grade 50/70 as in example 2 as well as the bitumen with 1.5 wt.-% of the wax mixture A were used to prepare asphalt concrete mix AC 11 DS according to TL StB 07/13. Both asphalt mixes were compacted at 145° C. and the fracture temperature was examined with the TSRST (Thermal Stress Restrained Specimen Test) according to DIN EN 12697-46 to obtain information on the low temperature performance of the asphalt (see table 5). During TSRST an asphalt specimen is kept at constant length while cooling it down with 10° C./h until the thermally induced shrinking forces crack the specimen.

TABLE 5

TSRST fracture temperature of AC 11 DS.

| Parameter [unit] | 50/70 bitumen | 50/70 1.5% wax mixture A |
|---|---|---|
| Fracture temperature [° C.] | −20.4 | −20.9 |

The results show that also the low temperature behavior of asphalt is not influenced by the wax mixture A, considering the precision of the test method.

Example 4

A polymer modified bitumen (PmB) grade 25/55-55 was mixed with 1.5 wt.-% of wax mixture A and the elastic recovery thereof was measured according to DIN EN 13398 and compared to a PmB without wax (see table 6). Polymer modified bitumen grades are in use for asphalt pavements with enhanced performance and durability. The specifications according to TL Bitumen-StB 07/13 for elastomer containing polymer modified bitumen grades (PmB A) require minimum elastic recovery.

TABLE 6

Elastic recovery test results.

| Parameter [unit] | PmB 25/55-55 | PmB 25/55-55 + 1.5% wax mixture A |
|---|---|---|
| Elastic recovery at 25° C. [%] | 72 | 75 |

Generally Fischer-Tropsch wax according to the prior art (Sasobit) reduces the elastic recovery of PmB. It was found that the wax mixture according to the invention does not reduce the elastic recovery of the elastomer modified bitumen.

Example 5

A bitumen with grade 70/100 (unmodified) according to DIN EN 12591 was mixed with 1.5 wt.-% of wax mixture A relative to neat binder and 30 wt.-% RAP-content to obtain a resulting binder of 50/70 quality and fresh aggregate and filler to produce an asphalt base layer mix AC 32 T S according to TL Asphalt-StB 07/13. The amount of wax mixture A in the resulting binder was 1.05 wt.-%. For comparison the same bitumen and RAP were used to produce the AC 32 T S asphalt mix without adding the wax mixture (reference). The bituminous binders were extracted from both asphalt mixes according to DIN EN 12697 and the properties were determined as in example 1 and are displayed in table 7. The physical properties of the resulting bituminous binder with 1.05 wt.-% of the wax mixture A were nearly the same as the properties of the bitumen without the wax, showing that the wax mixture has also no negative impact on the physical properties of harder bitumen grades.

TABLE 7

Bitumen properties after extraction from AC 32 T S asphalt mix.

| Parameter [unit] | Fresh bitumen 70/100 | Aged bitumen in RAP | Resulting bitumen without added wax (reference) | Resulting bitumen with 1.05 % wax mixture A |
|---|---|---|---|---|
| Penetration (25° C.) [0.1 mm] | 91 | 21 | 43 | 42 |
| Softening point Ring & Ball [° C.] | 45.4 | 68.6 | 55 | 57 |

Further the compaction resistance of the asphalt mixes produced with the bitumen composition of table 3 were measured with the Marshall compaction method according to TP Asphalt-StB Teil 10 B (see table 8).

TABLE 8

Marshall compaction resistance of asphalts obtained from bitumen compositions of table 7.

| Parameter [unit] | 0% Additive | 1.5% Wax mixture A |
|---|---|---|
| Compaction resistance Marshall @ 135° C. [–] | 29.1 | 25.8 |

It was found that the bitumen composition according to the invention decreases the compaction resistance and therefore increases the processability of the asphalt made therefrom.

Example 6

Bitumen samples extracted from various recycled asphalt pavements having the physical properties as given in table 10 were modified with 1.5 wt.-% of wax mixtures B consisting of 50 wt.-% PSW2 and 50 wt.-% FTW2 and wax mixture C consisting of 30 wt.-% PSW2 and 70 wt.-% FTW2 (see table 9).

TABLE 9

Properties of wax mixture B, wax mixture C and petroleum slack wax (PSW) and Fischer Tropsch wax (FTW) used in these wax mixtures.

| | Congealing point [° C.] ASTM D 938 | Penetration @ 25° C. [1/10 mm] ASTM D 1321 | Viscosity @ 100° C. [mm$^2$/s] ASTM D 7042-11 | n-alkane content * | Oil-content ASTM D 7211-06 |
|---|---|---|---|---|---|
| Wax mixture B (50% PSW2/50% FTW2) | 75.5 | 27 | 6.9 | | |
| Wax mixture C (30% PSW2/70% FTW2) | 79 | 19 | 7.9 | | |
| PSW2 (Prowax 750 from ExxonMobil) | 54.0 | 78 | 8.0 | | |
| FTW2 (Sasolwax C80) | 80 | 6 | 9.4 | 81.0 | 1.0 |

The properties of the bitumen samples were determined by measuring needle penetration according to DIN EN 1426 and the softening point (ring & ball) according to DIN EN 1427. The results in table 10 show that wax mixtures B and C in bitumen compositions according to the invention have no negative impact on the physical properties of very hard bitumen grades.

TABLE 10

Bitumen properties.

| Parameter [unit] | 0% Wax added (100% bitumen) | 1.5% Wax mixture B (98.5% bitumen) | 1.5% Wax mixture C (98.5% bitumen) | 1.5% FTW2 (98.5% bitumen) |
|---|---|---|---|---|
| Penetration at 25° C. [0.1 mm] | 19.0 | 19.0 | 19.0 | 18 |
| Softening point Ring & Ball [° C.] | 67.6 | 71.8 | 72.2 | 80.4 |

Example 7

A bitumen with grade 50/70 according to DIN EN 12591 was mixed with 1.5 wt.-% of hydrocarbon wax mixture A, aggregate and filler to produce an asphalt wearing course mix AC 11 D S. This asphalt mix was compacted using a segmented roller compactor according to DIN EN 12697-33. During compaction the same method as in the Marshall compaction (TP Asphalt StB Teil 10 B) was applied to determine the compaction resistance of the asphalt mix. The results (see table 11) showed that the hydrocarbon wax mixture A reduced the compaction resistance.

TABLE 11

Compaction resistance of asphalt mixes at different compaction temperatures produced with the bitumen compositions according to the invention.

| Parameter [unit] | 0% Additive | 1.5% Wax mixture A |
|---|---|---|
| Compaction resistance at 95° C. | 53 Nm | 48 Nm |
| Compaction resistance at 145° C. | 38.5 Nm | 36.5 Nm |

Example 8

As asphalt ages, the stiffness of the bitumen increases. The complex shear modulus $G^*$, measured with a Dynamic Shear Rheometer according to DIN EN 14770, is a characteristic value to evaluate the stiffness of bitumen.

In order to describe the ageing behavior of the bitumen, $G^*$ had to be determined for different ageing stages. Ageing indices were then calculated, i.e. $G^*$ after ageing divided by $G^*$ before ageing. The smaller the ageing index, the higher the anti-ageing impact.

Bitumen from a AC 16 B S binder course asphalt mix according to TL Asphalt-StB 07/13 with 20 wt.-% RAP was extracted and aged according to DIN EN 14769 (PAV-Pressure Ageing Vessel). The grade of the originally used bitumen was a 25/55-55. $G^*$ was measured after extraction and after PAV ageing of the extracted bitumen, and the ageing indices were calculated. This was done for two variants—with and without modification with wax mixture A. The following table 12 shows the results of the ageing indices at different test temperatures.

TABLE 12

Ageing indices of bituminous binders extracted from asphalt mixes AC 16 B S after PAV ageing.

| Ageing index $G^*_{PAV}/G^*$ | at 5° C. | at 10° C. | at 15° C. | at 20° C. | at 25° C. | at 30° C. |
|---|---|---|---|---|---|---|
| without wax | 1.529 | 1.549 | 1.649 | 1.894 | 2.098 | 2.154 |
| with 1.2 wt.-% wax mixture A | 1.126 | 1.150 | 1.203 | 1.387 | 1.529 | 1.682 |

The results show that the ageing indices for the variant with the wax mixture A are lower than those for the variant without the additive. The wax mixture therefore has an anti-ageing impact on the bitumen.

Example 9

The onset temperature of the crystallization of the wax mixture A in bitumen 50/70 was measured applying differential scanning calorimetry (DSC) technique according to ASTM D4419-90. Above the crystallization onset temperature the wax mixture reduces the viscosity of the bitumen composition and thereby improves the processability and compactibility of asphalt mixes made with the bitumen composition.

The results (see table 13) show that the wax mixture A provides improved asphalt compaction down to 57° C. whereas the prior art Fischer-Tropsch wax Sasobit provides this effect only above 90° C.

TABLE 13

Wax crystallization onset temperatures of 3% wax mixture A and 3% Sasobit in bitumen 50/70 measured by DSC at 2K/min cooling rate.

| Parameter [unit] | Bitumen 50/70 + 3% wax mixture A | Bitumen 50/70 + 3% Sasobit |
|---|---|---|
| Wax crystallization onset [° C.] | 57 | 90 |

Example 10

An asphalt mix was produced using 60% reclaimed asphalt pavement in the binder course mix ACbin16 and 50% reclaimed asphalt pavement in the wearing course mix ACsurf 11 according to the Czech regulations. The fresh part of the mix comprised bitumen grade 50/70 with 2.5 wt.-% wax mixture A. This resulted in 1.25 wt. % wax mixture A in the bitumen of the binder course and 1.0 wt.-% wax mixture A in the bitumen of the binder course of the final asphalt mixes. The asphalt mixes left the mixing plant at 150° C. As the ambient temperature was low (November in central Europe), the asphalt mix had cooled down to 130° C. when paved at the construction site. Despite this low paving temperature the laying and roller compaction was possible without problems and the required minimum degree of compaction was exceeded. The compaction degree was measured using a Troxler nuclear gauge (table 14). Nuclear density gauges are a frequently used tool in road paving for fast and non-destructive measurement of the density of the asphalt layers at the construction site. A nuclear radiation source emits a cloud of particles which interact with the asphalt. Radiation that is scattered back to a detector is counted. The denser the asphalt, the higher the probability the radiation will be redirected towards the sensor. A calibration factor is used to correlate the count to the actual density and compaction degree.

TABLE 14

Measured in-place compaction degrees in paved asphalt.

| Asphalt mix | Reclaimed asphalt content [%] | Resulting content of wax mixture A [%] * | Average compaction degree [%] | Specified compaction degree [%] |
|---|---|---|---|---|
| ACsurf11 | 50 | 1.25 | 99.2 | >97 |
| ACbin16 | 60 | 1.0 | 99.1 | >97 |

* in relation to total amount of bitumen

Example 11

An asphalt concrete wearing course mix AC 11 DS according to the German regulations TL Asphalt-StB 07/13 was produced. The mix contained 20% reclaimed asphalt and the fresh part was made with polymer modified bitumen PmB 25/55-55 according to the German regulation TL Bitumen-StB 07/13. One part of the asphalt mix contained 1.5 wt.-% wax mixture A related to the resulting total amount of bitumen, the other part of the mix did not contain wax and served as reference for the state of the art asphalt. Both asphalt mixes were paved at ambient air temperatures of 8-13° C. and at strong wind. The compaction degree was measured using a Troxler nuclear gauge after the paver and after each of three roller passes. At the same time the temperature of the asphalt was measured. The regulations ZTV Asphalt-StB 07/13 require a minimum compaction degree of 98% for the paved asphalt layer. The measured compaction degrees (table 15) show that the asphalt which contains wax mixture A was easier to compact and reached the specified minimum compaction degree of 98% already after one roller pass. The reference asphalt mix required two roller passes.

TABLE 15

Compaction degrees and temperatures during paving AC 11 DS asphalt mix.

| Time of measurement | AC 11 DS with 1.5% wax mixture A related to bitumen Degree of compaction [%] | AC 11 DS without wax (Asphalt temperature) |
|---|---|---|
| After paver | 88.6 (145° C.) | 88.7 (126° C.) |
| After 1 roller pass | 98 (122° C.) | 96.0 (118° C.) |
| After 2 roller passes | 99.1 (90° C.) | 98.7 (99° C.) |
| After 3 roller passes | 100.0 (87° C.) | 99.7 (84° C.) |

The invention claimed is:

1. A bitumen composition comprising a majority amount of bitumen, and a minority amount of at least one wax mixture consisting of 20 to 80 wt.-% of a petroleum slack wax (PSW), and
20 to 80 wt.-% of a Fischer-Tropsch wax (FTW),
each relative to the total mass of the at least one wax mixture.

2. The bitumen composition according to claim 1 comprising 0.5 to 2.5 wt. %, of the at least one wax mixture.

3. The bitumen composition according to claim 1, wherein the at least one wax mixtures consists of 30 to 70 wt. %, of the PSW, and the remainder being the FTW.

4. The bitumen composition according to claim 1, wherein the PSW has one or more of the following features:
 a congealing point according to ASTM D 938 below 65° C.;
 a MEK-oil content according to ASTM D 7211-06 above 15 wt.-%
 a kinematic viscosity at 100° C. according to ASTM D 7042-11 between 5 and 10 mm²/s;
 a needle penetration at 25° C. according to ASTM D 1321 above 50¹/₁₀ mm; and
 a n-alkane content below 40 wt.-%.

5. The bitumen composition according to claim 1, wherein the FTW has one or more of the following features:
 a congealing point according to ASTM D 938 above 70° C.;
 a MEK-oil content according to ASTM D 7211-06 below 5 wt. %;
 a kinematic viscosity at 100° C. according to ASTM D 7042-11 between 5 and 10 mm²/s;
 a needle penetration at 25° C. according to ASTM D 1321 below 10¹/₁₀ mm; and
 a n-alkane content above 80 wt.-%.

6. The bitumen composition according to claim 1, wherein the at least one wax mixture has one or more of the following features:
 a congealing point according to ASTM D 938 between 70 and 85° C.;
 a MEK-oil content according to ASTM D 7211-06 below 10 wt.-%;
 a needle penetration at 25° C. according to ASTM D 1321 between 15 and 30¹/₁₀ mm; and
 a n-alkane content above 60 wt.-%.

7. The bitumen composition according to claim 1, wherein the FTW, the PSW or both are hydrotreated.

8. The bitumen composition according to claim 1, wherein the bitumen composition further comprises one or more polymers selected from the group consisting of elastomers and plastomers.

9. The bitumen composition according to claim 1, wherein the bitumen composition further comprises one or more additives selected from the group consisting of rubber, resins, anti-stripping agents, fibers, organosilanes, surfactants and adhesion promoters.

10. An asphalt composition comprising the bitumen composition according to claim 1, stone aggregate and fillers.

11. The asphalt composition according to claim 10, wherein the asphalt composition comprises greater than 25 wt. % reclaimed asphalt.

12. A method for the production of asphalt pavements comprising the following steps:
- mixing the bitumen composition according to claim 1 with mineral aggregate and fillers at temperatures between 150 to 190° C.; in case of mastic asphalt up to 250° C. to obtain an asphalt composition;
- filling the asphalt composition in a truck or storage silo;
- transporting the asphalt composition to the building site;
- applying the asphalt composition to the surface with a paver to obtain an asphalt surface; and
- compacting the asphalt surface with a roller.

13. The method according to claim 12, wherein the process comprises adding greater 25 wt. % recycled asphalt, without heating it.

14. The method according to claim 12, wherein the applying and/or compacting of the asphalt composition takes place at temperatures below 150° C.

15. A method for the production of asphalt pavements comprising the following steps:
- transporting the bitumen composition according to claim 1, to a building site, having temperatures between 150 to 190° C.;
- spraying the bitumen composition on a surface;
- distributing mineral aggregates over the hot layer of the bitumen composition; and
- pressing the mineral aggregates into the layer of the bitumen using a roller.

* * * * *